United States Patent [19]
Wong et al.

[11] Patent Number: 6,117,499
[45] Date of Patent: Sep. 12, 2000

[54] MICRO-TEXTURE MEDIA MADE BY POLISHING OF A SELECTIVELY IRRADIATED SURFACE

[75] Inventors: Javier Wong, San Francisco; Li-Ju Judy Lin; Douglas Allan Iams, both of San Jose; Hongchuan Wong, Fremont; Tsutomu Tom Yamashita, San Jose, all of Calif.

[73] Assignee: Komag, Inc., San Jose, Calif.

[21] Appl. No.: 09/058,013

[22] Filed: Apr. 9, 1998

Related U.S. Application Data

[60] Provisional application No. 60/041,828, Apr. 9, 1997.

[51] Int. Cl.$^7$ ....................................................... B05D 3/06
[52] U.S. Cl. .......................... 427/599; 427/128; 427/130; 427/131; 427/132
[58] Field of Search ..................................... 427/599, 128, 427/130, 131, 132

[56] References Cited

U.S. PATENT DOCUMENTS

| | | | |
|---|---|---|---|
| 5,062,021 | 10/1991 | Ranjan | 360/135 |
| 5,108,781 | 4/1992 | Ranjan | 427/128 |

*Primary Examiner*—Nasser Ahmad
*Attorney, Agent, or Firm*—Jonathan A. Small

[57] ABSTRACT

A method of manufacturing a magnetic disk comprises the steps of: a) providing a substrate with a layer of an amorphous multi-component material at its surface; b) irradiating the amorphous layer (e.g. by applying heat from a heating element, laser beam, or the like) to thereby create microstructurally changed regions in the amorphous layer; and c) chemo-mechanically polishing the amorphous layer to produce micro-texture features at or near the micro-structurally changed regions. The disk is then completed by depositing additional layers such as an underlayer, a magnetic layer, a protective overcoat, etc.

16 Claims, 9 Drawing Sheets

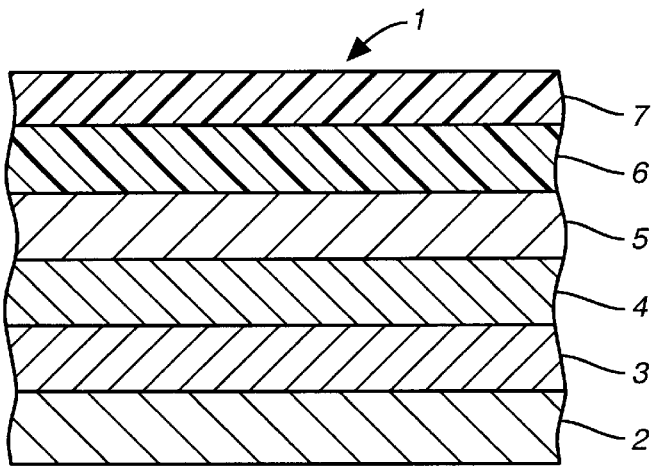
*FIG._1*
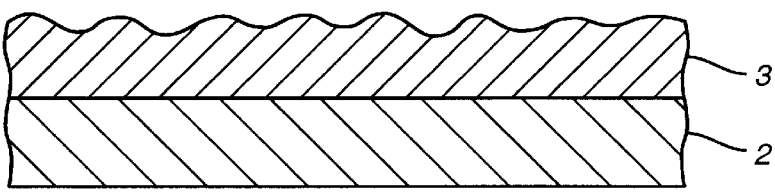
*FIG._2*
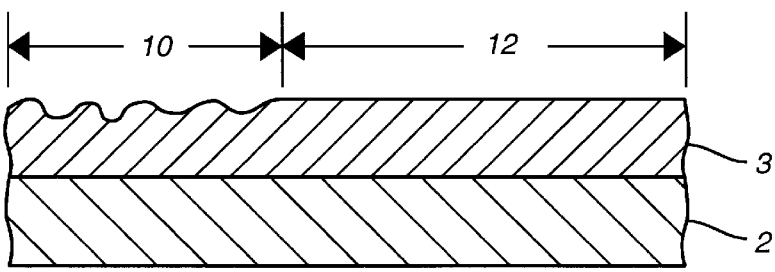
*FIG._3*
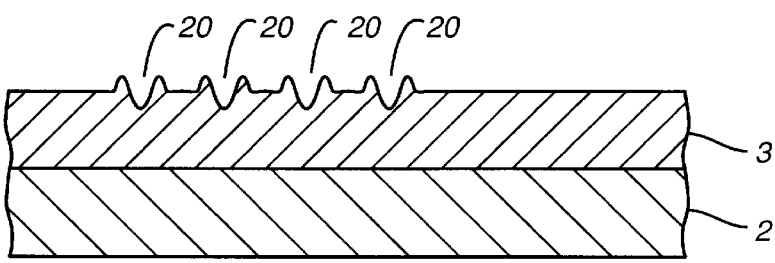
*FIG._4*
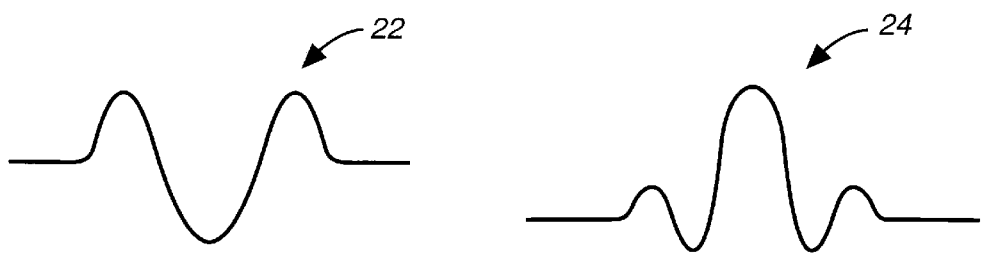
*FIG._5*   *FIG._6*

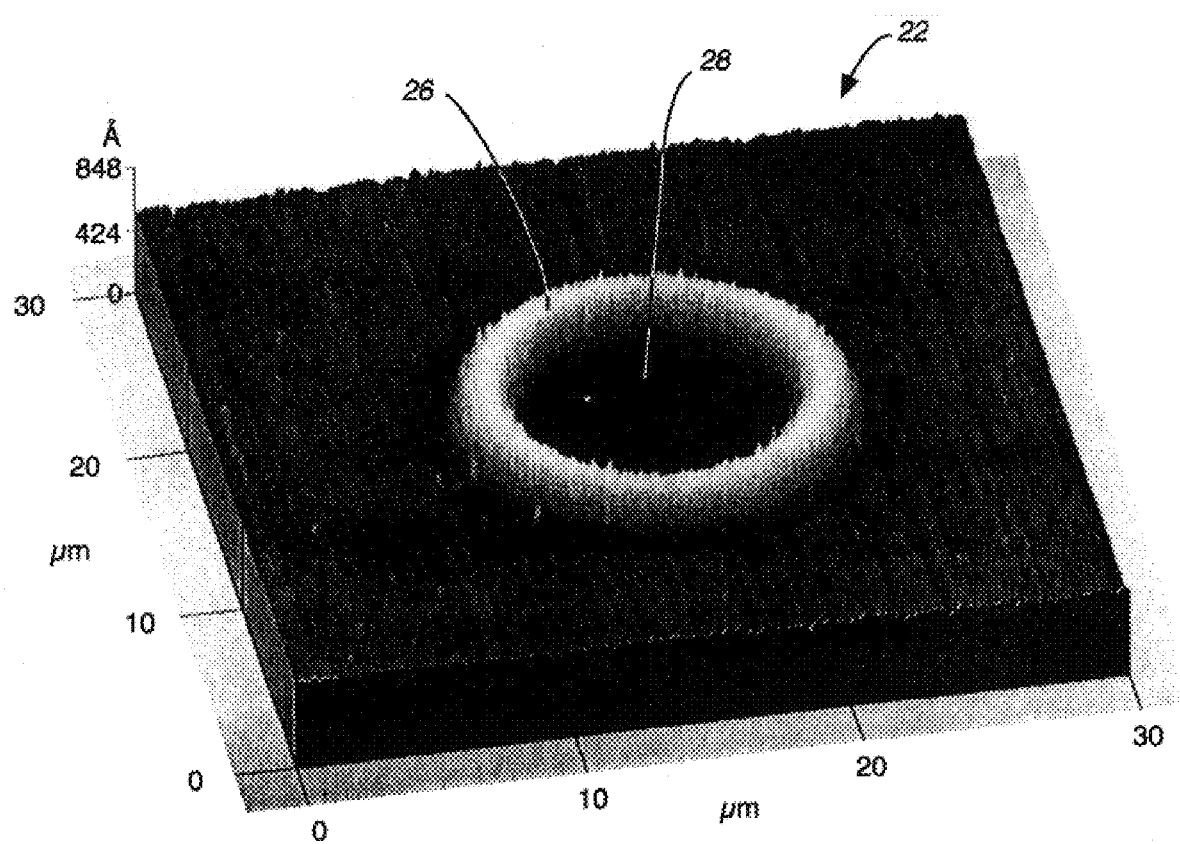
FIG._7

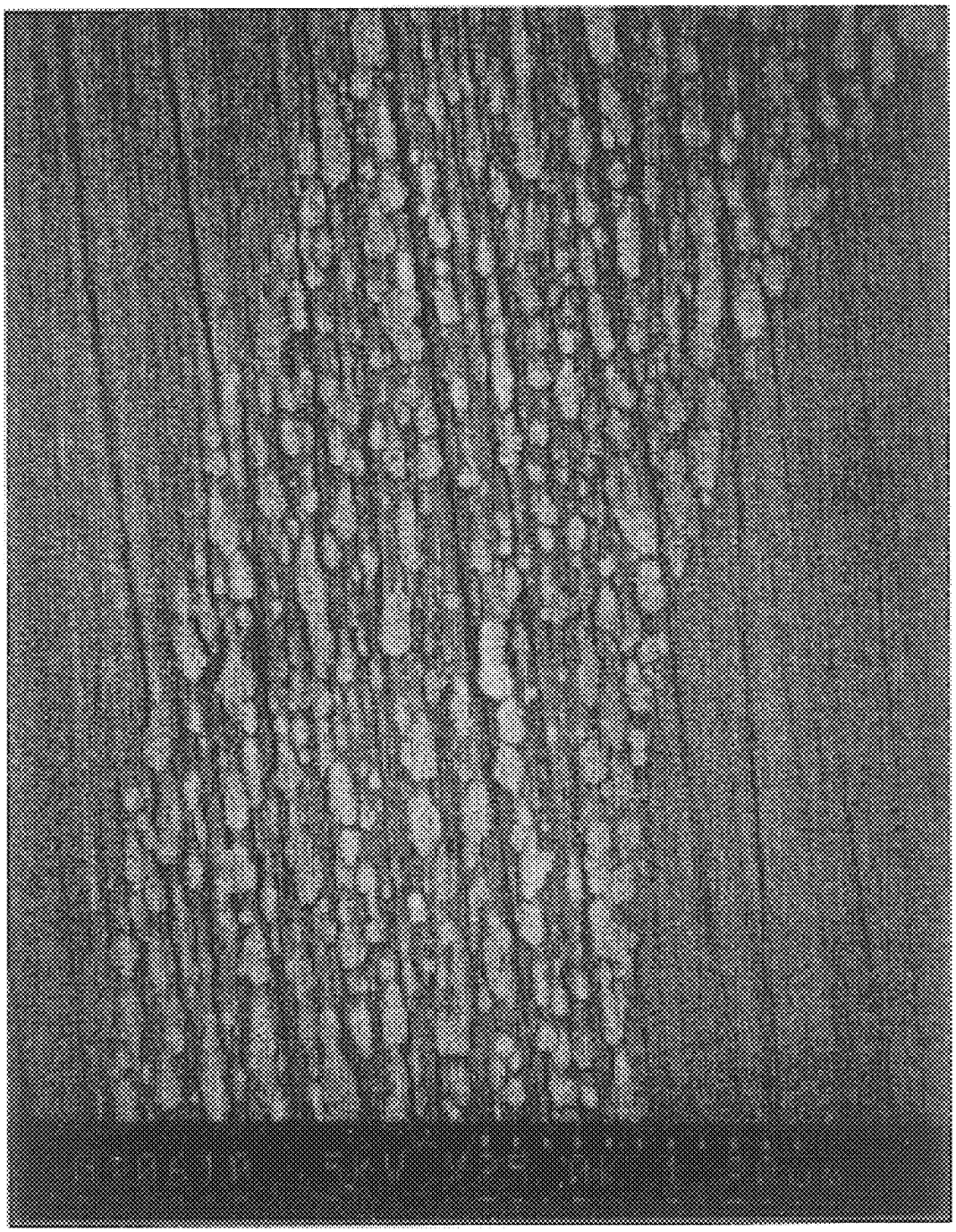
FIG._8A

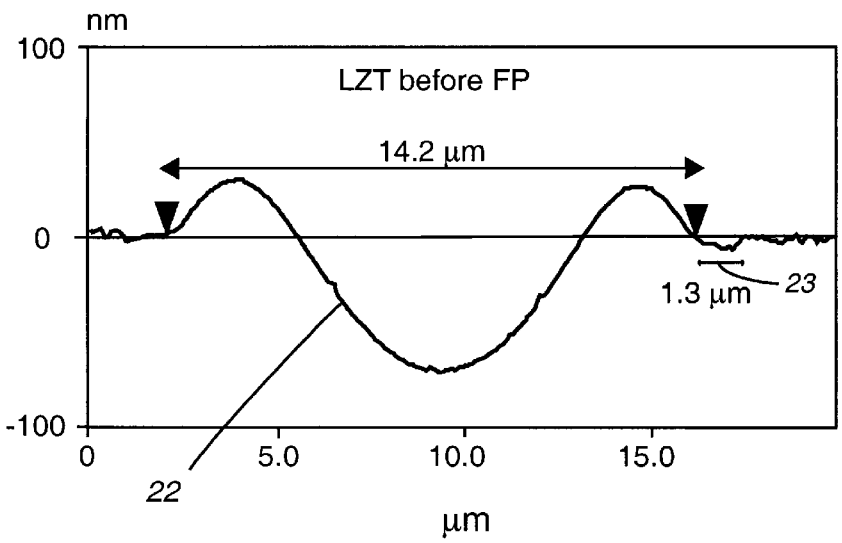
FIG._8B
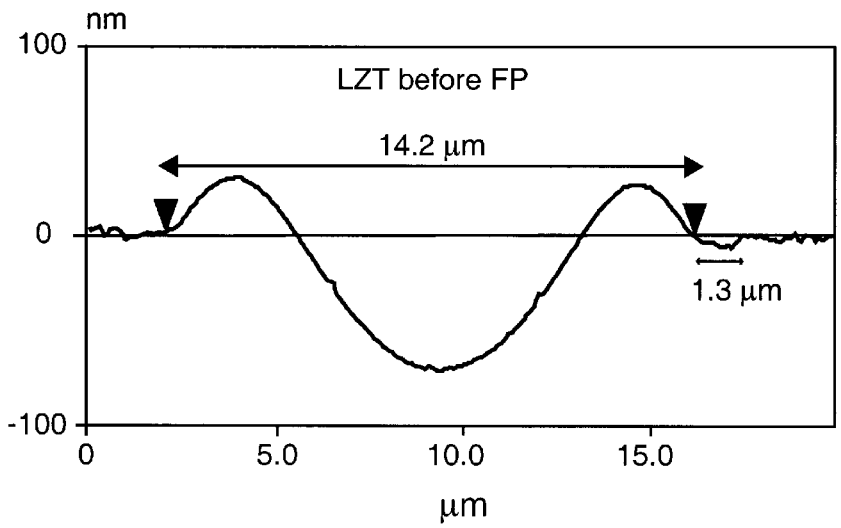
FIG._10A
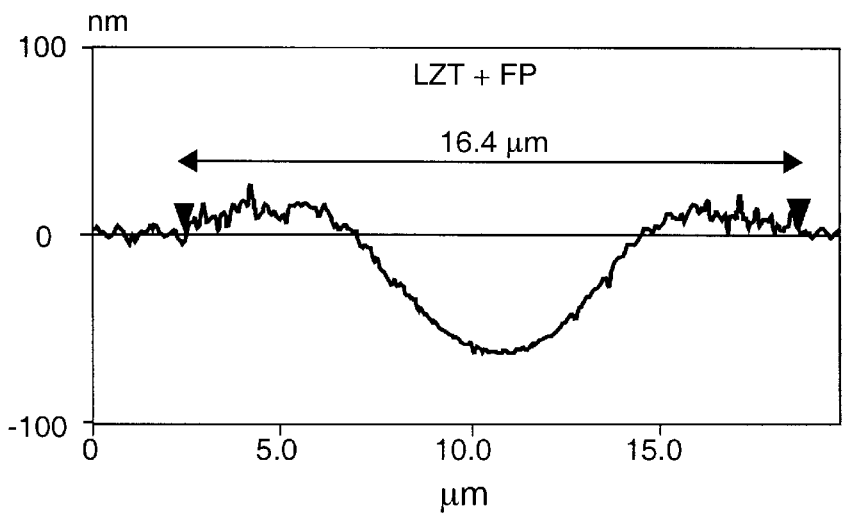
FIG._10B

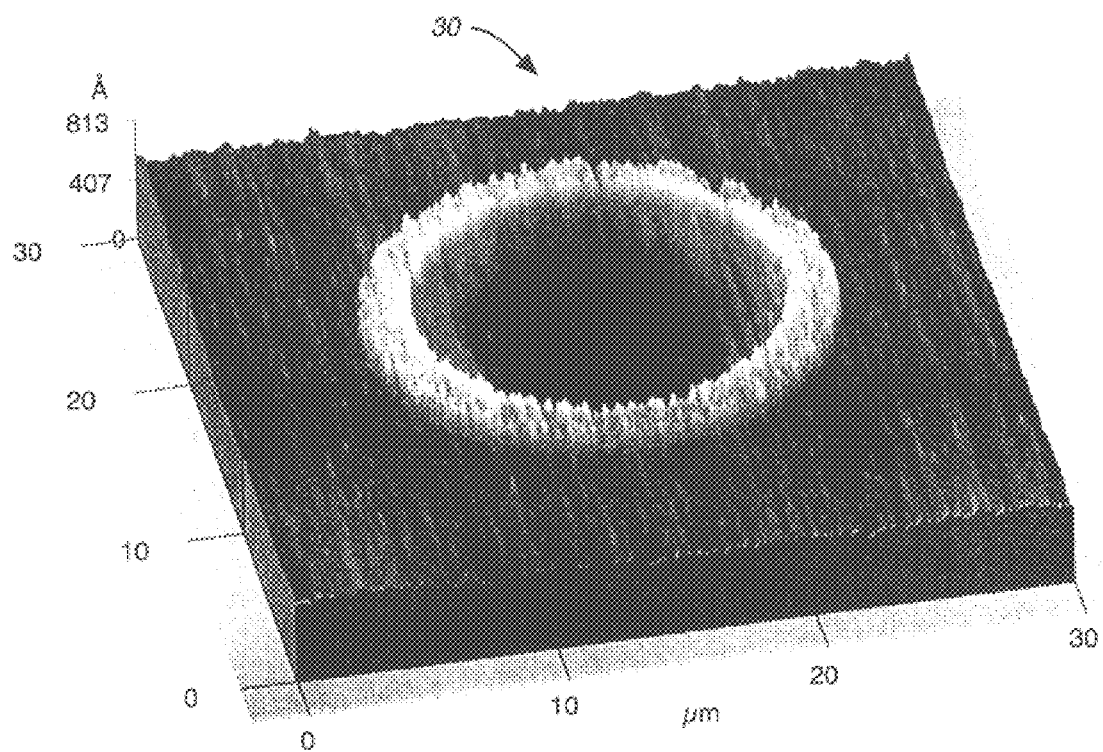
FIG._9

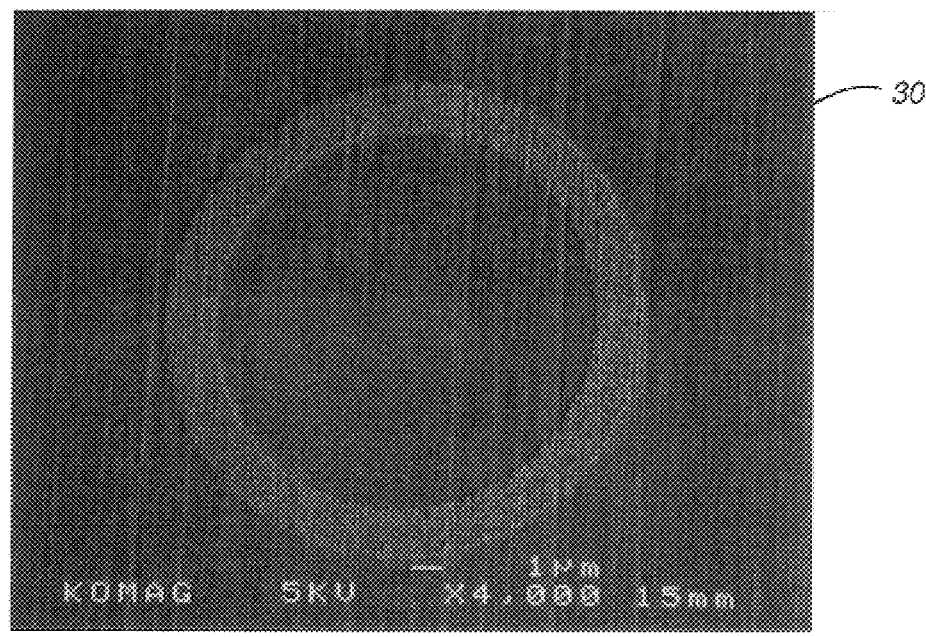
FIG._11A
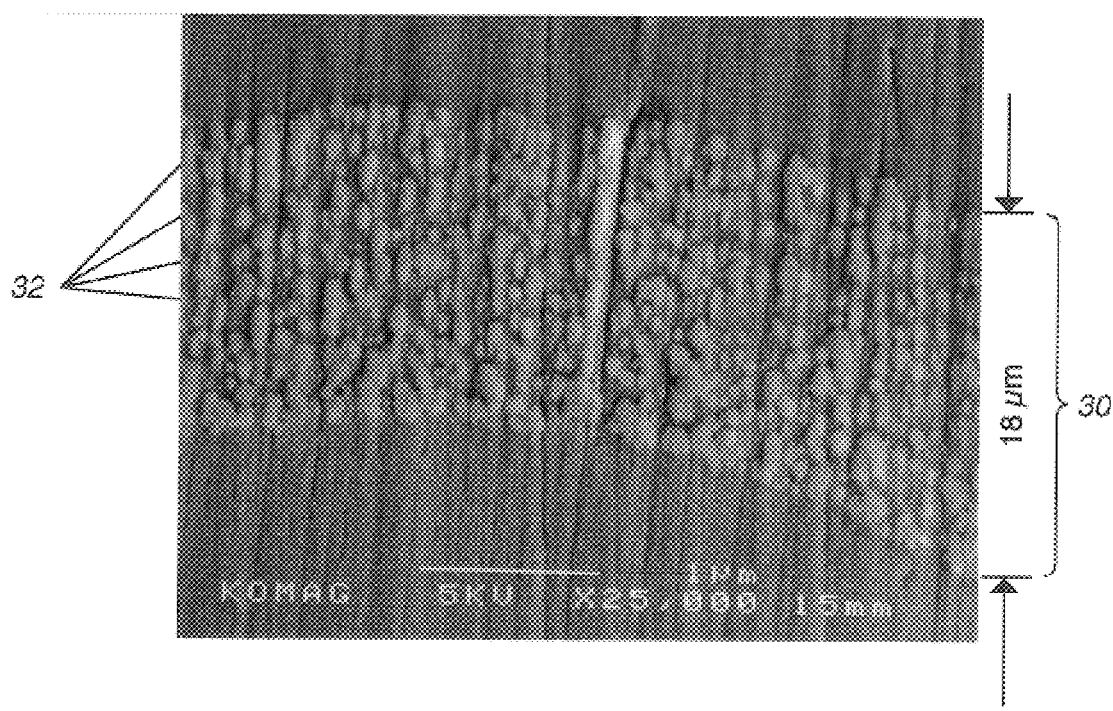
FIG._11B

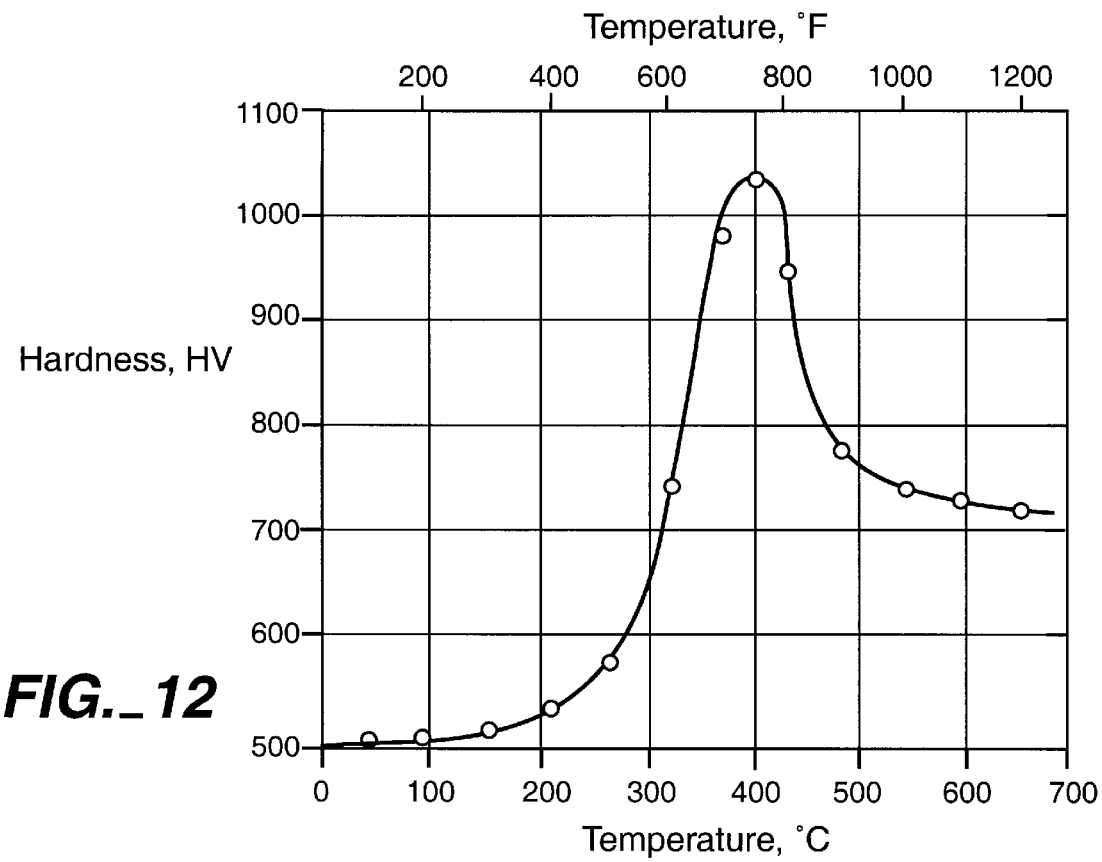
FIG._12
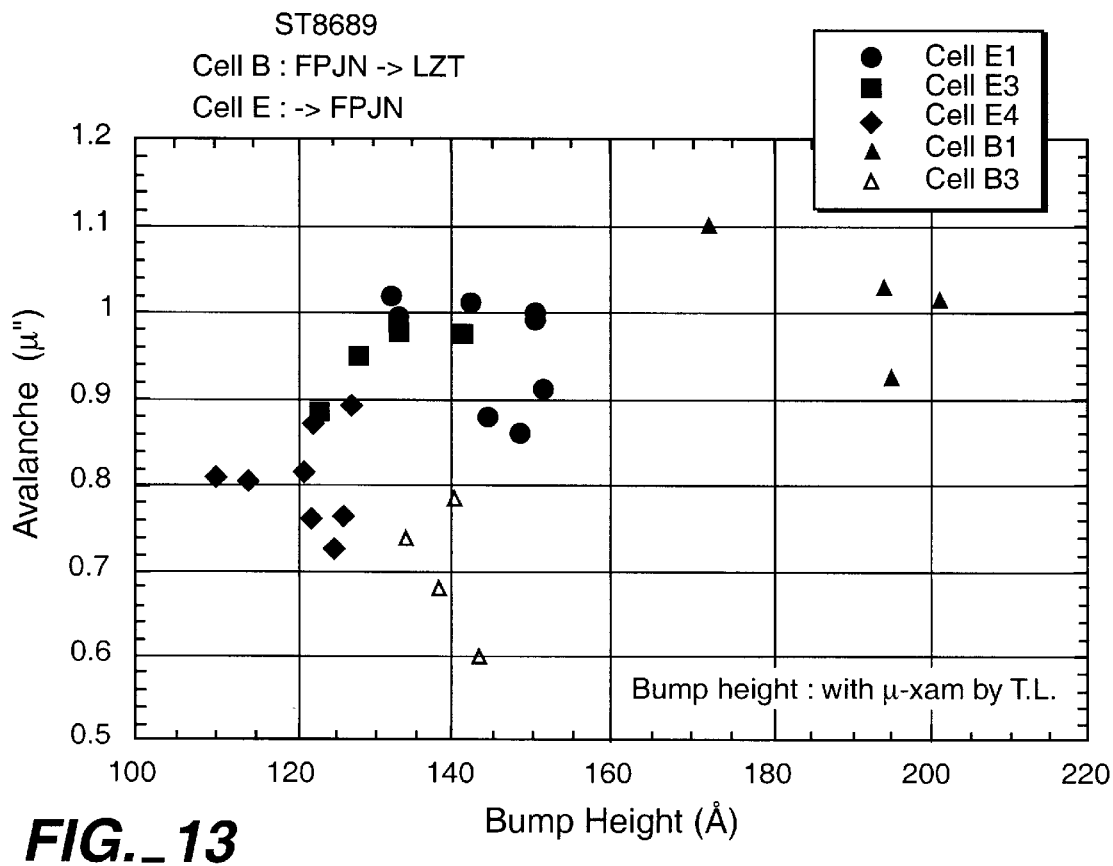
FIG._13

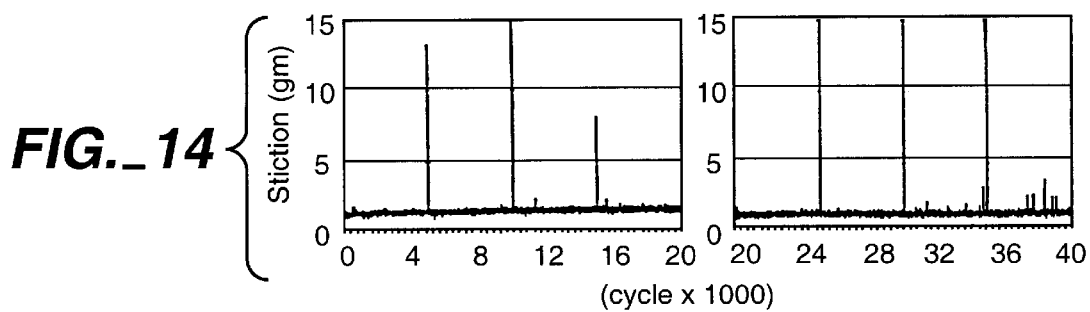
FIG._14
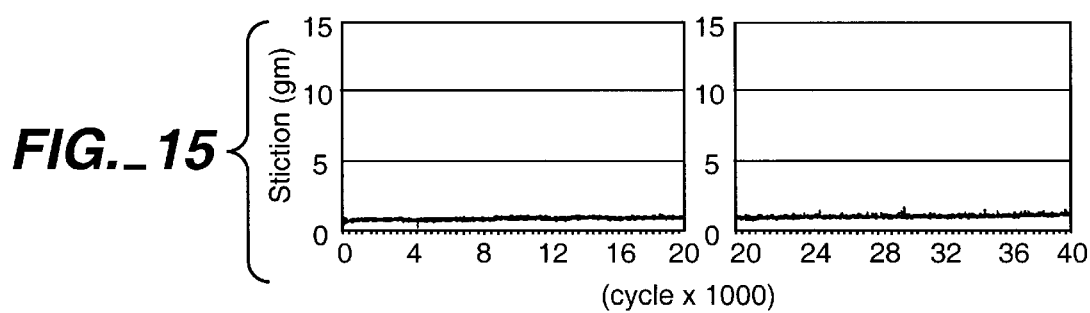
FIG._15
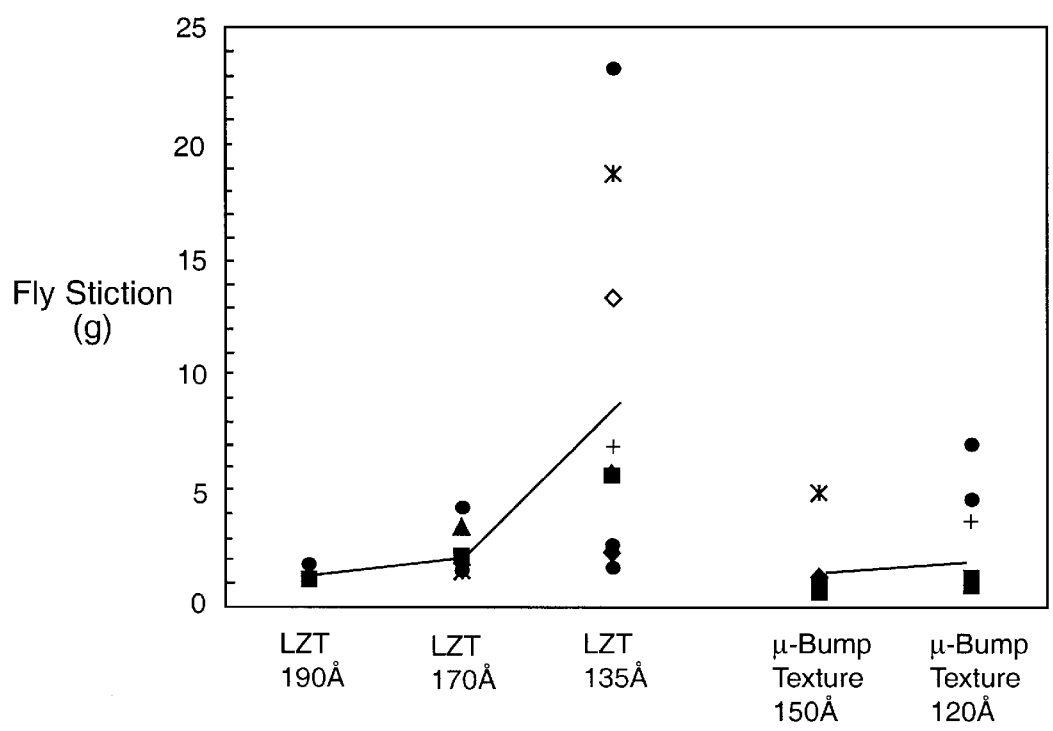
FIG._16

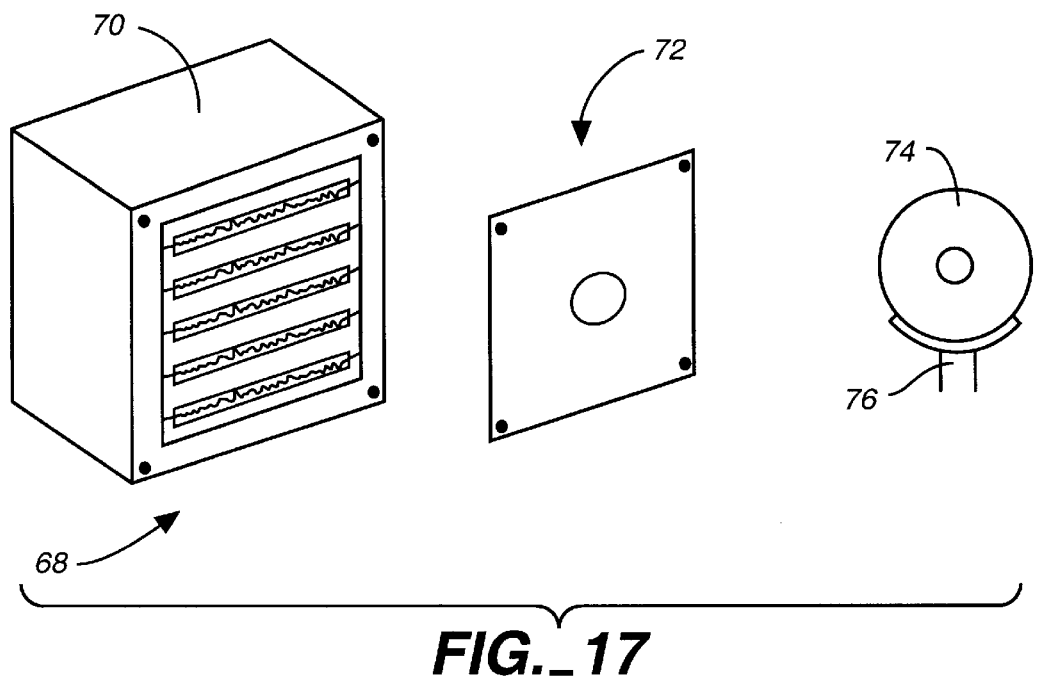
FIG._17
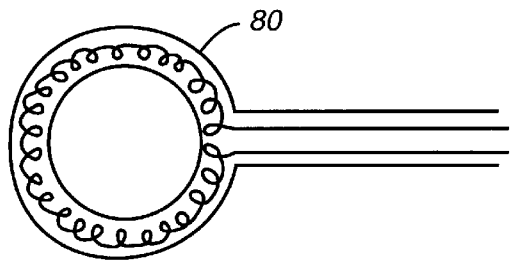
FIG._18
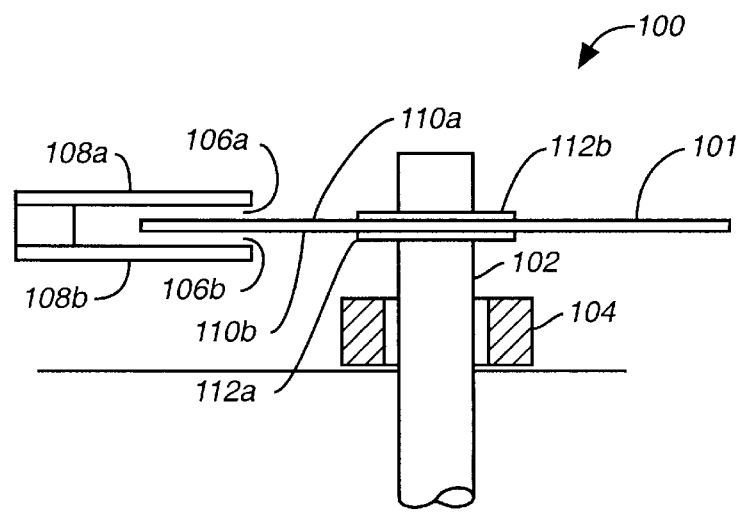
FIG._19

MICRO-TEXTURE MEDIA MADE BY POLISHING OF A SELECTIVELY IRRADIATED SURFACE

This application claims priority of provisional patent application serial No. 60/041,828, filed Apr. 9, 1997, which is hereby incorporated by reference.

The present invention relates to magnetic recording disks, and more particularly to a method for creating a desired surface texture on selected regions of magnetic recording disks for tribological purposes.

Magnetic recording disks for rigid disk drives are known to use an aluminum substrate plated with nickel phosphorus (NiP). A disk can range from 48 mm to 130 mm in diameter, with the disk thickness ranging from 15 mils (0.59 mm) to 75 mils (2.95 mm). Smaller diameter or larger diameter disks are used depending on the application.

Plated NiP of the type used for disks is well known in the art, as described in Metals Handbook, 9th edition. published by American Society for Metals (1982). Typically, the NiP layer is in the range of 10 to 20 $\mu$m thick, and covers the aluminum substrate uniformly over the entire disk. NiP is used to form a hard coat over the softer aluminum substrate so that the disk is made stiff and less susceptible to damage by the recording head. The NiP layer is polished to a near mirror finish, and to extremely tight flatness and geometrical specifications. The polished NiP surface is then controllably roughened for tribological reasons. This step of roughening the surface is usually called "texturing." There are several methods of texturing the polished NiP surface.

After texturing, the disks are cleaned and prepared for sputter deposition. Sputtered layers usually consist of an undercoat, a magnetic layer and an overcoat. Typically, sputtered chromium (Cr) or NiP are used as the undercoat. The magnetic layer typically consists of a Co alloy including Pt, Cr, Ta, Ti or other additives. These additives are used to control coercivity, corrosion resistance or micro-structural characteristics to affect the properties of the magnetic layer.

The overcoat is generally a sputtered carbon film. Typically some amount of hydrogen and/or nitrogen is incorporated into the carbon film to tailor its tribological performance. Above the carbon film, a thin layer of lubricant, usually made of a perfluoro-polyether compound, is applied. The lubricant protects the magnetic layer from wear as the recording head flies above the disk, and also when the drive is turned on or off. When the drive is turned on or off, the recording head is in sliding contact with the disk.

A typical disk drive contains one or more disks over which a recording head flies in close proximity to the disk surface to record data thereon. An actuator mechanism places the head precisely above a predetermined radius and sector of the disk to read and to write the data. Typically the fastest disk drives spin at 7000 to 10,000 rpm, and the flying head flies very close to the disk surface, currently about 25 nm above the disk surface.

In order to achieve higher recording densities, the number of bits per square inch of the disk is increased. The parameters of interest are number of concentric tracks per inch of the radius (TPI) and the linear density along the tracks or bits per inch (BPI). TPI times BPI is therefore the number of bits per square inch of the disk. Currently, typical high performance disks available in the market have a recording density of more than 1 giga-bit (1 billion) per square inch of disk surface.

Recording densities have been increasing every year at an historical rate of about 40% compound annual growth rate (CAGR) over a span of 20 years. In more recent years, the rate has increased to over 60% CAGR. One prerequisite for achieving higher recording density is to bring the recording and reading elements much closer to the disk surface. This achieves a sharper magnetic field profile from the recording head as it interacts with the magnetic disk. The closer the recording head is to the disk, the sharper the magnetic field, and the sharper transitions that can be recorded on the disk. Thus, the flying height of the recording head must be lowered ever closer to the recording layer of the disk in order to increase recording density. In order to achieve lower flying heights, disk surfaces have been made smoother and flatter, and free of asperities and protrusions that can cause the head to contact the disk. For a head flying at 25 nm above the disk, for example, the disk is tested for "safe" flying heights below the nominal flying height, at (for example) 80% of the nominal flying height, which would be 20 nm, in order to insure that the entire disk surface is flyable at the nominal flying height. The tested flying height is usually termed "glide height" and is typically specified to tight tolerance specifications. In order for the disk to achieve higher density, the glide height must be lowered.

Another key characteristic of disk drives which is important to the design of disks is that drives are turned off occasionally or frequently depending upon the application. When a drive is turned off, the recording head is typically brought to the inner radius of the disk to land on the disk surface. Therefore the recording head surface (termed the slider) is designed to fly, and also designed to tolerate a sliding stop on the disk surface. A dedicated landing area (or landing zone) is designated, typically at the inner radius of the disk surface, for the sole purpose of providing a landing surface for the slider. Data is not recorded in the landing area since it has a greater potential to be lost due to slider contact with the disk surface. Since every square micron of disk surface is a valuable area on which data can be stored, the landing area is usually minimized to gain as much surface as possible for recording data on the disk. Therefore, the geometry of the landing area is usually precisely specified and held to a tight tolerance.

As mentioned, depending upon the application, the drive can be turned on or off many times during its life. A typical drive may be specified to withstand a minimum of many tens of thousands of start-stops during the life of the drive. Such operation is called contact start stop ("CSS"). In extreme cases, where 100,000 CSS cycles or more are specified, both the slider and the disk surface must withstand severe demands on their durability. The specifications for CSS are in units of friction coefficients or starting friction for the slider to be dislodged from the disk surface when the drive is turned on (this is known as "stiction"). Stiction can be specified as lateral force with some standard normal force that is assumed, or in terms of stiction coefficient which is lateral force divided by normal force (in which case stiction is dimensionless). The disk drive motor usually has a limited amount of torque (to minimize size and cost of the motor), and stiction values can be specified with respect to some fraction of the available motor torque. However, the usual specification calls for a stiction coefficient not to exceed, for example, 0.6 after 20,000 CSS cycles. For a typical 3 gram load of normal force imparted to the slider through the suspension, the maximum lateral force allowed to overcome stiction is therefore 1.8 grams. For a drive with multiple disks and heads, the stiction values are additive across all the head media interface. Further, due to various drive operating environments, the starting stiction may have additional requirements at different temperature and humidity conditions.

As mentioned above, due to the severity of the CSS conditions, the disk surface is usually lubricated with thin liquid perfluoropolyether layer to reduce wear between the slider and the disk surface. Very small thicknesses are usually involved, in the range of few to tens of angstroms of lubricant. Although the lubricant reduces wear at the disk-slider interface, it can cause a problem. Specifically, when two very smooth surfaces contact each other, as is the case with the head and the disk, the two surfaces may develop a very strong attractive force with each other when the interface is wetted with a liquid such as the lubricant. The force is so strong that in some cases the head can be literally torn off completely from the suspension during drive start-up if this phenomenon occurs. In order to prevent this situation from developing, a slight roughness is imparted on the disk surface in the landing area so that lubricant does not "wick" the interface when the slider is at rest on the landing area. The amount of roughness must be very precisely matched to the amount of lubricant on the surface to protect against wear. The roughness must be tailored to be slightly rougher than the amount of lubricant that could wick the interface. The "roughness" imparted on the disk surface is termed "texture". The texture also helps reduce stiction during CSS by having many supporting points for the slider during sliding. The term "texturing" is distinguished from "polishing" in that polishing is usually applied to the disk to create a very smooth and flat surface. "Texturing" is done after polishing to impart a controlled roughness back on to the surface to prevent lubricant induced wicking between the slider and the disk.

There is yet another requirement for disk drives that sensitively depends on the texture and the lubrication. In some drive operating environments, the disk drive may be in operation for a very long time such as one year before it is shut down for maintenance or due to an unplanned event such as a power failure. In such an operating environment, it has been found that a flying head can accumulate a significant amount of lubricant from the disk surface on parts of the slider surface. When the drive is then turned off for a day or two, there is an increased tendency for the slider and disk to become stuck due to lubricant or other hydrocarbon contaminants that wick the slider disk interface. The term "flying stiction" refers to this phenomenon. Again, the disk texture must be sufficiently "rough" to survive such an event. It is generally accepted that rougher texture is needed to keep the lubricant or other contaminants from wetting the slider/disk interface.

The main problem with imparting a "texture" to the landing area of the disk is that it makes the disk surface rougher and hence brings the disk surface that much closer to a flying head. The margin between the flying height and the top most region of the texture area is reduced, thereby increasing the potential for head disk contact and hence the possibility of a head crash. As the pressure to increase recording density forces lower flying heights, the balancing between achieving a good glide height clearance, and the need to maintain good CSS and stiction values are in conflict. This conflict between the need for texture on the one hand and the need to fly lower on the other hand is one of the most difficult challenges in disk design.

There are many ways of texturing a disk. The most conventional way is to apply a line scratch pattern on the disk surface using abrasive tape or slurry. (See, for example, Fukuda et al. in U.S. Pat. No. 4,698,251). The pattern is usually concentric and can be applied over the entire disk surface, in a graded manner with the inner radius having rougher texture and gradually becoming smoother at the middle and outside radius of the disk, or in a zone where only the inner landing area is textured. The abrasive material used to create the texture can be alumina ($AlO_2$) or diamond. The most advanced version of this texturing method is zone-textured mechanical texturing. By applying the mechanical texture only in the landing area, CSS and stiction values are maintained at a good level, while the data area is left in a polished state to achieve a low glide height performance.

One of the main disadvantages of this method is that it is very difficult to achieve a low glide height beyond a certain limit, while still maintaining good CSS and low stiction. The use of abrasive material sufficient to create the roughness necessary to avoid CSS and stiction problems also causes significant amount of disk surface gouging and asperities which makes it difficult to simultaneously maintain good glide performance and low defect counts. Texture gouges cause unrecoverable errors if the entire disk surface is covered with the mechanical texture. Zone texturing is therefore preferable, but applying mechanical texture precisely where it is needed and with good control is very difficult. Further, there is always a transition region between the textured area and the smoother polished area. Typically the best transition region that can be made for a mechanical zone texture is of the order of hundreds of microns wide. Within this transition region, data may not be recorded reliably due to its roughness. Therefore, valuable recording area is lost if the transition region is not used for recording data.

Another method of texturing is so-called sputter texturing as described by Mirzamaani et al. in IEEE Trans. Magn. Vol. 28, pp. 3090–3092 (1992). In this method the texture comes from a roughness that develops from a deposited film which is placed just beneath the magnetic layer and the undercoat. Although this method provides good glide performance, it is very difficult to apply the texture in a precise location. For optimum performance, the data area must be made as smooth as possible, while the CSS landing area has the minimum texture needed to meet mechanical requirements. With sputtering in-situ along with the magnetic layer, the benefit is to use one deposition machine to deposit the magnetic layer as well as texturing, but the zone texture must be done with some form of a mask during sputtering and this would be difficult to achieve.

Other zone texture methods use a laser to create a small band in the landing zone including a series of small melted craters with enough height to support CSS. Such methods for creating texture features on the surface of magnetic disks using lasers are discussed in U.S. Pat. Nos. 5,062,021 and 5,108,781 to Ranjan et al., and published European Patent Application number 94308034.1.

As is known from these references, a pulsed laser beam is focused onto the surface of one layer of a magnetic recording disk or substrate with sufficient intensity to locally melt a portion of that layer and/or sublayers. Following incidence of the laser pulse, the melted region resolidifies, leaving a topographic variation (referred herein as a "laser texture feature") on the surface of the targeted layer and/or sublayers. The geometric characteristics of the laser texture features are a function of many parameters, including laser power, pulse duration, laser spot size, shape, substrate composition, etc.

The key advantage of laser texturing is that it offers a precise way of placing an identical and highly controlled texture precisely where it is needed. Compared to the mechanical zone texture, the zone can be placed precisely within tens of microns, and there is essentially no transition region. The CSS and stiction values are usually superior to those of the mechanical or sputter texture method. The disadvantage however is that laser texture method is still limited in terms of achieving lowest glide height possible without causing CSS and stiction problems. For example, using current slider technology and testing methods, the minimum laser texture feature height that must be maintained is typically 20 nm or more in order to maintain good CSS, stiction and fly stiction performance. This laser texture feature height limits glide performance to at most around 25 nm. Smaller laser texture features cannot adequately support a flying head, and the resulting interaction between the head and the disk damages the head and possibly the disk. Thus, it is a technical challenge to provide a laser texture feature capable of supporting flying heights lower than 25 nm.

SUMMARY OF THE INVENTION

A rigid magnetic disk has unique new texture features formed on a polished surface of an amorphous material which provide low glide height and glide avalanche performance, and simultaneously provide excellent CSS and low fly stiction values. Compared to current state-of-the-art recording disks with laser texture features, a magnetic disk texture in accordance with the invention provides the same or better CSS and fly stiction values. This allows the recording head to fly lower on the disk, which permits higher recording density.

A method in accordance with our invention comprises the steps of:
   a) providing a substrate with a layer of an amorphous multi-component material at its surface;
   b) irradiating the amorphous layer (e.g. by applying heat from a heating element, laser beam, or the like) to thereby create micro-structurally changed regions in the amorphous layer; and
   c) chemo-mechanically polishing the amorphous layer to produce micro-texture features at or near the micro-structurally changed regions.

The disk is then completed in a manner known in the art or otherwise, by depositing additional layers such as an underlayer, a magnetic layer, a protective overcoat, etc.

The amorphous layer may be NiP, NiNb, or one of many other suitable multi-component materials. Irradiation of the amorphous layer may be by heat lamp, oven, laser beam or other source capable of relatively rapid heating and cooling of the layered substrate. The irradiation may be over the entirety of both of the disk's surfaces, or may be limited to specified portions of the disk's surfaces, such as landing areas. Also, the irradiation may be in a continuous region of the layer, as may result from use of an unmasked heat lamp, oven, or the like (see, for example, U.S. Pat. No. 5,506,017, issued to Ranjan and incorporated herein by reference), or may be in discrete regions as may result from use of a masked heat lamp, laser beam, etc.

In any event, the irradiation causes a micro-structural change in regions of the amorphous layer. While the precise mechanism resulting in this change is not understood at this time, we believe that it may be in part local crystallization of the amorphous material, and/or some degree of local segregation of the components of the multi-component amorphous material. By performing a chemo-mechanical polishing process on the irradiated (and hence micro-structurally changed) layer, finer and small texture features (hence, we refer to such features herein as micro-features) are formed as compared to prior art texturing methods.

According to one embodiment of the present invention, irradiation is achieved conveniently by the same laser texturing method which is used in conventional laser texture feature formation . A circular (or oval) laser spot thermally treats regions of a NiP layer at the inner radius of a disk in a CSS landing area by forming a concentric (or spiral) pattern of spots. Departing from the convention laser texture process, following the formation of the laser texture features, the chemo-mechanical polishing is performed. Thus, instead of using the laser melting of NiP as the primary means of forming texture features, the laser pulse induces microstructural changes in certain regions of the NiP material. The micro-texture of the present invention then forms at the regions of microstructural change following the step of chemo-mechanical polishing.

In conventional laser feature texturing, the primary variables are laser wavelength, laser power and pulse duration which directly affect the height and shape of each laser texture feature formed in the NiP. However, in the process of the present invention, the concern is how much and to what extent is a microstructural change induced in the NiP layer by the laser pulse, and selection of parameters of the chemo-mechanical polishing needed to turn the microstructurally changed regions into micro-texture features.

Typically, the chemo-mechanical polishing consists of two steps. In the first step, the surface of the amorphous layer is mechanically polished using a very fine diamond slurry. (In lieu of a diamond slurry, other types of particle-slurry mixes, such as SiC, $Al_2O_3$, etc. may be used). Immediately thereafter, the disk surface is chemically polished using a polishing tape and low pH lubricant. These two polishing steps typically obliterate most or all of that part of the laser texture features protruding above the surface of the disk. A new texture feature emerges after the chemo-mechanical step which is composed of very fine micro-texture features.

In another embodiment, a conventionally laser textured NiP plated disk with a feature height of about 25 nm is a starting point for our new process. For a conventional laser texture feature with a ridge-shaped cross-section, the region undergoing microstructural transformation lies at the outside edge of the feature between the region melted by the laser and the unaffected surrounding NiP material. When this surface is then subjected to the two-step chemo-mechanical polishing as described above, the resulting texture is a ring which contains many small micro-texture features, with heights that can be controlled by the extent (force and time) of polishing.

The high points of the original laser induced feature are cut down by chemo-mechanical polishing. The new ring is larger than the original laser induced feature, at a radius out from the point of heating where the temperature and cooling rates were favorable for microstructural transformation to occur in the NiP. Using this method, a texture height of about 15 nm may be obtained, and the resulting CSS performance is superior (stiction is significantly reduced) as compared to using known laser texture features having heights of 25 nm or so. The new micro-texture feature has a lower height than prior art textures, so that the glide avalanche point of this texture is significantly lower. This allows the media to support heads flying at much lower height.

A thermally treated NiP region is believed to be chemically different than other regions of the NiP. For example, it is known in the art that heating the NiP affects the hardness of the NiP as shown in Metals Handbook, 9th edition, discussed above and incorporated by reference. Thus, we believe that thermally induced recrystallization of the NiP is one mechanism at work. However, it is generally known that many amorphous materials are hardened by heat treatment, so that we conclude that this invention is applicable to such other amorphous systems.

BRIEF DESCRIPTION OF THE DRAWINGS

FIG. 1 schematically illustrates a typical rigid magnetic disk in cross-section.

FIG. 2 schematically illustrates in cross section a conventional mechanically textured surface, textured with an abrasive tape or slurry.

FIG. 3 schematically illustrates in cross-section a conventional, mechanically zone textured surface formed using abrasive tape or slurry.

FIG. 4 schematically illustrates in cross-section a conventional laser zone texture disk (ridge type).

FIG. 5 schematically illustrates in cross-section the "ridge" type laser texture feature.

FIG. 6 schematically illustrates in cross-section a "sombrero" type laser texture feature.

FIG. 7 is an atomic force micrograph (AFM) of a conventional ridge type laser texture feature with a diameter of 14 μm base to base, and height of about 25 nm.

FIG. 8A is an ultra high resolution scanning electron micrograph (SEM) of the base of the ridge type laser texture feature showing a "cobble-stone" feature on the surface of the NiP.

FIG. 8B is a cross sectional view of the region of the laser texture feature of FIG. 8A in which the "cobble-stone" region appears.

FIG. 9 is an AFM of the newly formed "micro-texture feature" after chemo-mechanically polishing the laser texture feature of FIG. 7.

FIGS. 10A and 10B are AFM cross section profiles, comparing the conventional laser texture feature of FIG. 7 and the micro-texture feature of FIG. 9, respectively.

FIGS. 11A and 11B are SEM micrographs of the micro-texture feature of FIG. 9, showing the surface morphology of the micro-texture features.

FIG. 12 is a plot of hardness of NiP against annealing temperature, from Metals Handbook, 9th edition, published by the American Society for Metals.

FIG. 13 is a plot of glide avalanche against feature height for a conventional laser texture (ridge type) disk and a micro-texture disk.

FIG. 14 shows CSS test results for a conventional laser texture disk with 15 nm feature heights, tested to 40,000 CSS cycles.

FIG. 15 shows CSS test results for a micro-texture disk with feature heights of 15 nm tested to 40,000 CSS cycles.

FIG. 16 is a plot of fly stiction values for various laser texture and micro-texture disks with different feature heights.

FIG. 17 shows a heater and a mask for zone heat treating a disk.

FIG. 18 shows a heating coil for zone heat treating a disk.

FIG. 19 shows a disk drive using a disk constructed in accordance with our invention.

DETAILED DESCRIPTION

For purpose of illustration, the present invention will be described by way of selected embodiments. It will be apparent to one skilled in the art that the embodiments demonstrate the functionality and features of the present invention. It will also be apparent that variations, additions, deletions, modifications, etc., to the embodiments, although not specifically discussed herein, are contemplated and within the scope of the present disclosure. Therefore, recitation of embodiments is not intended as, nor should be read as, limiting the scope of the invention.

As shown in FIG. 1, a magnetic recording disk 1 is typically a layered structure consisting of a substrate having a base material layer 2 such as an aluminum alloy, and a plated underlayer 3, for example plated NiP. Typically, additional layers are deposited by vacuum deposition, such as by sputtering. For example, a sputtered underlayer 4 such as NiP or chromium, a magnetic layer 5 such as an alloy of cobalt, nickel, and platinum, and protective overcoat layer 6, such as carbon may then be deposited onto the substrate. A lubricant layer 7 may thereafter be deposited. Variations in the order, methods of deposition, and materials of these layers, and the inclusion of fewer or greater numbers of layers may be used.

FIG. 2 schematically shows a conventional mechanical texture on plated and polished NiP layer 2 using abrasive slurry or tape. In this case, the disk is rotated while the tape or abrasive slurry with a polishing pad or tape rubs against the disk, so that a series of multiple concentric grooves are formed on the polished NiP surface. A typical machine used to texture the disk using this method is model 1800 made by EDC corporation, Santa Clara, California which textures both side of the disk surface simultaneously using abrasive tape or slurry dispensed onto a polishing tape. Alternatively, texturing can be done using Strasbaugh model 6DE-DC-ZSP2 made by Wm. Strasbaugh Company, Santa Clara, California. This model textures disks one side at a time using a circular polishing pad which rotates against the disk while the disk is also rotating. In the case of abrasive slurry, the abrasive material can be $Al_2O_3$, diamond, silica, SiC or other hard ceramic polishing materials or other suitable materials. Polishing pads or tapes are typically made of cloth, polyurethane, or a variety of synthetic fibers such as nylon, rayon and polyester. For typical mechanically textured disks, there is a limit on the smoothness to which the texture can be made. As the texture is made smoother, the glide height clearance between the head and the disk is increased. However, once the head lands on the disk, the smoother surface usually suffers from high stiction.

FIG. 3 schematically shows a conventional mechanical texture where the texturing is done selectively over the contact start stop (CSS) zone 10 at the inner radius of the disk, while the rest of disk surface 12 (the data area or zone) is left alone to preserve the original smooth polished surface. This type of texture is called mechanical zone texture where the CSS zone (i.e. the landing zone) is roughened to support the start-stop operation of the drive, while the data area is maintained at a polished condition to reduce possibility of head disk contact in the data area. Due to the higher roughness of the CSS zone, the clearance between the head and the disk is reduced. In a good drive design, the head is typically kept away from the CSS zone as much as possible to avoid potential contact between the head and the disk which can cause disk wear. The recording head usually has some width however, so that when the head accesses the innermost track closest to the landing zone, a part of the head generally straddles the contact start stop zone where the disk is rougher. Therefore, even in the case where there is a zoned texture, the CSS zone must be kept as smooth as possible (or a gradual transition zone provided between the data zone and the CSS zone).

FIG. 4 schematically shows a texture created by a series of laser pulses which locally melted the NiP to create a concentric series of features 20. By varying the laser power and pulse duration, or by changing the beam size, a variety of laser feature shapes and patterns can be generated. The shape of feature 22 in FIG. 5 is usually referred to as a "ridge" or "donut" shape. FIG. 6 shows another type of laser texture feature 24, which in cross section is shaped like (and hence referred to as) a "sombrero". The laser texture method is described by Ranjan et al. in U.S. Pat. Nos. 5,062,021 and 5,108,781.

FIG. 7 is an atomic force microscopy (AFM) photograph of a single 25 nm high ridge type laser texture feature created by YAG laser system with pulse duration of 65 ns at power of 0.5 watts. The diameter of the laser feature is about 14 μm at the outer diameter of the ridge. A closer examination of the as-laser textured feature at the edge of the feature at the outside where the height is about the same as the rest of the NiP surface reveals evidence of microstructural transformation in the NiP material. FIG. 8A is a high resolution scanning electron microscope (HRSEM) micrograph of the transition region. A "cobble-stone" like feature on the surface of the NiP suggests that structure of the NiP has changed due to laser thermal treatment. FIG. 8B shows in cross section the region of the laser texture feature experiencing the micro-structural transformation.

As previously mentioned, the present invention is, in part, a unique process for forming a micro-texture on the surface of a rigid magnetic recording disk. In general, the method involves irradiating the surface of an amorphous layer to create a region of micro-structural change. According to one embodiment, this may be accomplished by the above described laser texture process, as evidenced by the region of the laser texture feature experiencing the micro-structural transformation shown in FIGS. 8A and 8B.

Furthermore, it is an aspect of the present invention that post irradiation, the amorphous layer be subjected to a chemo-mechanical polishing step. FIG. 9 shows one embodiment of this aspect of the invention, in which the sane ridge type laser texture feature 22 of 25 nm as shown in FIG. 7 was treated by such a chemo-mechanical polishing treatment. Polishing was done using an EDC model 1800 made by EDC corporation, Santa Clara. In this equipment, the disk is rotated, while rayon polishing tape is pressed against both sides of the disk with a roller (not shown). A first step of the polishing method consisted of using 0.25 μm diamond slurry applied to a polishing tape (tape number FP 404, made by Mipox Corporation of Japan). The roller force applied to the tape and to the disk was 4 pounds, the disk was rotated at 260 rpm, and the total polishing time was 15 seconds. A second step was done using the same EDC machine and the same rayon polishing tape, with only the lubricant applied to the tape. Lubricant used was type SP407 made by Actrachem Corp. The pH of the lubricant was adjusted to 2.2 with KOH. Wiping force was 3 lbs, and disk rotation was at 230 rpm. The wiping duration was 10 seconds. All times, speeds, pressures, etc. are approximate.

A comparison of FIGS. 7 and 9 shows the effect of the chemo-mechanical polishing on the laser texture feature. The original texture feature 22 has been replaced by a new micro-texture feature 30 which appears completely different than the original laser induced feature. The diameter of the micro-texture feature 30 has been increased to around 16 μm from the original diameter of 14 μm of the laser texture feature 22.

FIGS. 10A and 10B show the height profiles of the original laser texture feature 22 (of FIG. 7) and the new micro-texture feature 30 (of FIG. 9), respectively. A comparison shows the change in profile. The ridge shape feature 22 of FIG. 7 includes a circumferential raised ridge 26 and a central depression 28. The resultant micro-texture feature of FIG. 9 shows that the raised ridge 26 of feature 22 has been removed. Only the depression 28 of feature 22 remains. The new micro-texture feature 30 forms outside of the location of the original laser feature 22, at the same location where the high resolution SEM showed the "cobble-stone" feature in FIGS. 8A and 8B. The "cobble-stone" feature is a surface feature and the texture features that are newly created are a result of interaction of chemo-mechanical polishing and what lies at or underneath the "cobble-stone" features. The new texture includes many fine sharp features with lower overall height.

FIGS. 11A and 11B show close-ups of the newly formed micro-texture feature 30 by a SEM. The fine lines shown vertically in the figures are the mechanical polishing marks left behind by the first step using 0.25 μm diamond polishing. Within the ring, there are numerous fine features 32 of various sizes which are all sub-micron in size. These are shown in FIG. 11B. However, the laser induced feature 22 has a relatively smooth featureless profile across the height of the entire feature.

The mechanism involved in the formation of micro-texture features is, we believe, as follows. The NiP material at transition region 23 shown in FIG. 8B underwent micro-structural transformation induced by the laser pulse. This transition region has different heating and cooling characteristics compared to the melted region originally formed by the laser texture. We believe that some form of localized material segregation and partial crystallization occurred in the NiP at the transition (or micro-structurally changed) region 23 which is responsible for the unique texture features that develop after the two step polishing process. The evidence for the material change is shown by the "cobble-stone" appearance in FIG. 8A NiP as-plated is entirely amorphous. Phosphorus is forced into the lattice of nickel, and the crystalline structure of nickel never materializes during plating. NiP is also paramagnetic as opposed to being ferromagnetic as is the case with pure nickel. This amorphous structure of NiP is not thermodynamically stable. If the material is annealed at a high enough temperature ($\geq 300°$ C.) for a sufficient amount of time, crystalline phases begin to develop and the ferromagnetic nickel phase appears.

Other material properties also change as amorphous NiP is heated. FIG. 12 for example shows what happens to the hardness of NiP as it is annealed at successively higher temperatures. The data was taken from page 227 of Metals Hardbook 9th edition. It can be seen that NiP film hardness changes dramatically as annealing temperature is changed. Material transformation is also a function of annealing time. Laser pulse thermal treatment is done with a short pulse of laser power, and it occurs within a few nano-seconds. Very rapid heating and rapid cooling also occur, as heat is quickly dissipated by the surrounding matrix. The main heated area is heated so rapidly that it apparently does not have time to convert to a more thermodynamically favorable state. Hence it remains amorphous and it does not show any change in material properties such as magnetic parameters. Apparently the transition region 23 (FIG. 8B) of the laser feature has received different heat-time treatment which causes some transformation of the NiP material into a form that renders it sensitive to chemo-mechanical polishing.

The use of chemistry and mechanical means to polish is referred to as chemo-mechanical polishing. It will be appreciated that, as described below, polishing processes comprise both chemical and mechanical action. Although the exemplary polishing processes described herein typically utilize both actions to some extent, polishing processes that are primarily chemical or polishing processes that are primarily mechanical may be used in the practice of the present invention. Additionally, it will be appreciated that processes different from those described herein, such as chemical mechanical planarization ("CMP") processes known in the semiconductor wafer processing industry may also be used in the practice of the present invention. Thus, the term polishing as used in the present application is understood to encompass all means of polishing including the foregoing. Typically abrasives are used, with addition of either high or low pH or other reactive chemicals to enhance the quality of the polish. The lubricant used during chemo-mechanical polishing is typically a phosphate ester. In one embodiment, the mixture is a 1:1 mixture of a mono and a di phosphate ester, although this ratio is not critical. The lubricant can also contain some residual free phosphoric acid.

The pH of the lubricant appears to affect the material removal selectivity of the chemo-mechanical polish. A low pH appears to give greater selectivity to the removal process (i.e., preferentially removing Ni less aggressively), while higher pH provides less selectivity. Our invention is not limited to specific pH's, but it is preferred that the pH be less than about 7, and preferably about 2.2. It is preferred that the pH is greater than 1. The pH can be adjusted by adding KOH.

FIG. 13 shows the glide avalanche measurement of disks made with conventional ridge type laser texture features of various heights compared to the disks with a micro-texture with different feature heights. FIG. 13 represents data from about fifteen disks (and therefore about 30 surfaces). The horizontal axis is the feature height as measured by a phase shift microscope. The micro-texture disks were created from disks having 25 nm high ridge type laser texture features which were chemo-mechanically polished. For comparison, the conventional laser texture disks were made by applying the chemo-mechanical polishing before laser texturing. For the micro-texture disks, the laser texture was applied on mechanically polished surfaces. The chemo-mechanical polish was then applied after the laser texture. The purpose was to keep the same base plane NiP characteristics for both types of texture.

Glide avalanche is defined as the height of the flying head at which a significant increase begins to be seen in the head-disk contact. The measurements were taken with well-characterized sliders of known flying height which were then successively lowered in flying height for each type of disk. Head disk contacts were monitored by sensitive piezoelectric crystals mounted directly on the head or by monitoring characteristic acoustic emission signals from the slider that were generated by head-disk contact. The lower the glide avalanche, the more capable the disk is to achieve higher recording densities by virtue of lowered flying height capability.

Generally speaking, the glide avalanche is lower for disks having lower feature heights. FIG. 13 shows that micro-texture features and conventional laser texture features of equivalent height provide comparable glide avalanche capabilities. It is a simple matter however to reduce the glide avalanche by successively lowering the feature height for either case. Therefore the true test of a texture's capabilities is its tribological performance. For any given texture, a certain minimum roughness is required in order to support contact start stop (CSS) and stiction requirements. A superior texture will have lower glide avalanche while simultaneously supporting required CSS and stiction values.

FIGS. 14 and 15 are CSS tests taken at ambient room temperature and humidity conditions on a conventional laser texture disk versus the micro-texture disk, respectively. Both disks had about the same feature height (about 15 nm), and the same lubricant was applied to both. In this experiment, the test head was made to run repeated CSS cycles on the textured landing zone area for 40,000 cycles and starting stiction values were measured for every cycle. At every 5000 cycles, the head rested on the CSS track for 2 hours to intensify the effect on start-up stiction (parking stiction). FIG. 14 shows that for the conventional laser textured disk, there are large stiction spikes occurring at every 5000 cycles while the micro-textured disk of FIG. 15 shows no stiction spikes at all. Similar tests were conducted at 30° C. and 80% relative humidity (not shown) and similar results were obtained showing superior performance for the micro-textured disk.

CSS testing at low temperature and humidity is one of the most severe tribological performance tests. At low temperature, the mobility of the lubricant above the carbon layer is significantly reduced, and morphology and durability of the feature against wear under reduced lubricant recovery is severely tested. A set of CSS experiments to compare the conventional laser texture against the micro-texture was made at 5° C. and 15% relative humidity. The results are tabulated in Table 1. The CSS tests are conducted for 10,000 cycles, and number of failures are recorded.

TABLE 2

| Texture type: | Feature height | Criteria/#Cycles |
|---|---|---|
| Conventional Laser Texture | 23 nm | 2/4 fail at 2000 cycles (crash) |
| Micro-texture | 15 nm | 8/8 pass |

The micro- texture disk, even with a much lower feature height of 15 nm, against 23 nm for a conventional laser textured disk, showed significantly better peformance at cold-dry conditions than the conventional laser texture disk. Two out of four conventional laser tectured disks crashed at 2000 CSS cycles.

FIG. 16 is a graph of fly stiction versus various feature heights for a conventional laser texture disk and a micro-textured disk made by the method described for FIG. 9. In both cases, the magnetic layer, overcoat, and lubrication conditions were the same. The fly stiction test consisted of flying the head over the media for 3 days over a single track at the outer diameter of the 95 mm dizameter disk, followed by parking at the landing zone for one day. The drive was then started up and the initial start-up stiction was measured. The test simulated the effect of long term flying followed by a shut-down. Test data for conventional laser textured disks is labeled "LZT", and the data for micro-textured disks according to the present invention is labeled "$\mu$-Bump Texture". FIG. 16 shows that with a conventional laser texture, the stiction values increased dramatically when the feature height hit 13.5 nm, while the micro-texture disks according to the present invention showed good stiction values at feature heights as low as 12 nm. Each point represents one data point in the plot. Therefore, the results show that for the future low flying—high area density applications, the micro-textured disks of the present invention are significantly superior to conventional laser textured disks.

The reason for the superior performance of the micro-texture over the conventional laser texture probably lies in the high density of small features contained within the micro-texture feature. For tribological performance, having many contact points to support the head during CSS appears advantageous, particularly in the cold-dry conditions. Small contact points allows the entire feature height distribution to be lowered without suffering the usual consequences of high stiction during CSS and high fly stiction.

In one embodiment of the invention, laser heating is accomplished using laser pulses of 60 to 230 ns, spot sizes of 7 to 13 µm, and an energy per pulse of 1.4 to 25 µJ. A NiP layer comprising 9 wt. % P can be used. The first step in the chemo-mechanical polishing process can be accomplished using the EDC Corporation model 1800 machine and the following parameters:

| Tape type: | FP404 tape |
| --- | --- |
| Tape speed: | 2.0 inches/minute |
| Roller type: | 80 Duro (durometer) |
| Spindle rotation speed: | 260 rpm |
| Texture force: | 4 lbs |
| Slurry size: | 0.25 µm (hard particles such as diamond, SiC, or $Al_2O_3$) |
| Slurry rate: | 0.3 g/sec |
| Texture time: | 15 seconds. |

The second step can be accomplished without using a slurry, but with the following parameters:

| Tape type: | FP404 |
| --- | --- |
| Tape speed: | 2.0 inches/minute |
| Roller type: | 40 Duro |
| Spindle rotation speed: | 230 rpm |
| Wiping force (downward pad force): | 3.0 lbs. |
| Lubricant type: | SP407 |
| Lubricant pH: | 2.2 |
| Wipe time: | 10 second |

As mentioned above, typical magnetic disks comprise NiP plated onto an Al alloy substrate. Our invention is not limited to a specific substrate. Other substrates may be used, e.g. Ti, glass, glass ceramic, carbon, alloys and composite materials.

Our invention can be used to form a zone texture (e.g. a texture confined to a landing area). Our invention can also be used to texture an entire disk surface. In yet other embodiments, a set of textured zones can be formed on a disk.

As mentioned above, other multi-component amorphous materials can be used in lieu of NiP. Other means of irradiating the substrate, such as heating coils, flash lamps, rapid thermal processing or similar means may be used. In addition, it will be appreciated that using the teachings of the present invention, the material need not necessarily be a multi-component material and need not necessarily be an amorphous material. While not wishing to be bound by theory it is believed that any material that forms the micro-structural change illustrated, for example in FIGS. 8a and 8b, by the methods of irradiation described herein may be used in the practice of the present invention.

The morphology created by a method in accordance with our invention is unique. Small, grainy microscopic bumps are formed having a diameter in the range of about 20 to 50 nm and heights in the range of about 10 to 25 nm. In the case of an NiP layer being textured, these features comprise material that has a different microstructure or composition, i.e. one that exhibits enhanced etch resistance. In the case of other multi-component amorphous materials, the features may also or alternatively comprise mostly one of the components of the original multi-component material (or a subset of the original set of components of the multi-component material).

Since the micro-texture is generated by thermal transients that occur during heating of NiP by laser texture, what matters is the nature of the microstructural transformation that occurs in the amorphous layer, which is then expressed by chemo-mechanical polishing. In the conventional laser texturing process, the resulting feature from the laser process itself is the key feature for the texture. In the present invention, the laser feature is a secondary effect. It is in fact mostly removed during the process of forming the micro-texture features by chemo-mechanical polishing. Therefore any means of rapid heating and cooling, including such technology as flash lamps, are also applicable to this method. FIG. 17, for example, shows a system 68 including a heater 70, which may be used with a mask 72 for zone heat treating, or without a mask for full surface heat treating a disk 74 held in mandrel 76. FIG. 18 shows a heating coil 80 which may replace heater 70 and mask 72 in system 68 of FIG. 17 for similarly heat treating a zone of a disk. Also, other irradiation elements such as rapid thermal anneal apparatus (e.g. device model RTP available from Applied Materials) may be employed to produce the micro-texture of the present invention.

Also, a variety of laser beam shapes such as the aforementioned circular shape, oval shape, multiple concentric circles, etc., as well as patterns such as concentric circles, spirals, cross-hatching, etc. can be used to create a region in the amorphous layer where microstructural transformation takes place. These patterns can then be delineated by the chemo-mechanical polishing to create a unique pattern of micro-bumps to fit the particular needs of slider geometry and drive configurations.

A completed magnetic recording disk in accordance with the present invention is typically used in a disk drive 100 shown in FIG. 19, in which disk 101 is mounted on a rotor shaft 102 which, in turn, is rotated by a motor 104. A pair of read-write heads 106a, 106b are mounted on the end of associated arms 108a, 108b. Heads 106a, 106b can be ferrite heads, thin film heads, magneto-resistive heads, or other types of read-write heads. Heads 106a, 106b "fly" in proximity to disk 101, where they can write data to and read data from the magnetic film on sides 110a, 110b of disk 10, respectively.

Arms 108a, 108b can be moved inward or outward (directions 112 and 114, respectively) to permit heads 106a, 106b to access data tracks at different locations of the disk. Motion of arms 108a, 108b are controlled by a servo motor (not shown). When disk 101 is at rest, heads 106a, 106b may be made to "park" in the CSS zones 112a, 112b. Examples of disk drives are disclosed in U.S. Pat. Nos. 4,949,202 (Kim); 5,025,335 (Stefansky); 5,027,241 (Hatch); and 5,025,336 (Morehouse), each of which is incorporated herein by reference. Magnetic recording disks in accordance with this invention can be incorporated in other types of disk drives as well.

In a further embodiment of the present invention, a lower dose of irradiation is used. For example, in an embodiment utilizing a laser, lower laser energy, or an unfocused laser beam, etc. may be used to lessen the intensity of the laser on the surface. In such an embodiment, the "conventional"

portion of the laser feature such as shown in FIGS. 5 and 6, is smaller than the laser feature that results from conventional laser texturing. In this way, a larger percentage of the laser feature than that shown for example in FIG. 8, shows the microstructural change. For example it has been found that the mircrostructural change not only surrounds the rim of the feature, but also extends significantly up the rim of the feature. In such an embodiment, it is further desirable to form a greater number of the smaller features placed closer together. The net result of this embodiment is that a high percentage of the surface area is primarily textured by the microstructural changes as opposed to by laser texture features. In this way, the required extent of polishing may be greatly reduced. In some embodiments it may be possible to eliminate the polish step, and use the microstructural change itself as the texturing.

Moreover it is believed that first performing an anneal of the e.g. NiP layer, appears to facilitate the formation of the microstructurally changed region. In a further preferred embodiment, it is desirable to use both the lower intensity of irradiation in combination with an anneal prior to the irradiation.

As mentioned above, the above embodiments are merely illustrative. Modifications may be made without departing from the spirit and scope of the invention. A variety of magnetic layers, e.g. cobalt or iron based, may be used. Other underlayers, substrates and overcoats can be used. Deposition techniques other than plating and sputtering may be employed. Accordingly, all such modifications come within our invention.

What is claimed is:

1. A method of manufacturing a magnetic disk employing a substrate, comprising the steps of:

providing on said substrate a first layer;

irradiating said first layer to thereby create micro-structurally changed regions in said first layer; and after said step of irradiating, polishing said first layer to produce micro-texture features at or near the micro-structurally changed regions.

2. The method of claim 1, wherein said first layer comprises an amorphous material.

3. The method of claim 1, wherein the step of irradiating is performed by applying laser pulses to a surface of said first layer.

4. The method of claim 1, wherein only a selected, continuous portion of said first layer is irradiated to thereby create micro-structurally changed regions in said first layer.

5. The method of claim 4, wherein the substrate is disk-shaped and has an inner diameter, and the selected, continuous portion is an annulus beginning roughly at the inner diameter and extending a selected distance radially outwardly from said inner diameter to thereby form a landing zone.

6. The method of claim 1, wherein only a plurality of selected, discrete regions of said first layer are irradiated to thereby create micro-structurally changed regions in said first layer.

7. The method of claim 5, wherein the substrate is disk-shaped and has an inner diameter, and the selected, discrete regions are within an annular portion of the first layer beginning roughly at the inner diameter and extending a selected distance radially outwardly from said inner diameter, to thereby form a landing zone.

8. The method of claim 2, wherein said amorphous material is multi-component.

9. The method of claim 8, wherein said amorphous multi-component material is selected from the group consisting of NiP and NiNb.

10. The method of claim 1, wherein the step of polishing comprises:

mechanical polishing using a fine-particle abrasive mixed in a slurry; and polishing by bringing a polishing tape in contact with the first layer in the presence of a lubricant having a pH between 1 and 7.

11. The method of claim 10, wherein the pH of the lubricant is approximately 2.2.

12. The method of claim 1, wherein the step of irradiating the first layer creates a plurality of laser texture features, each having a laser texture feature diameter, and wherein the step of polishing said first layer causes the laser texture features to be replaced by the micro-texture features, each having a micro-texture feature diameter, and wherein each micro-texture feature diameter is greater than each laser texture feature diameter.

13. The method of claim 1, wherein the micro-texture features have a mean diameter in the range of approximately 5–20 μm.

14. The method of claim 1, wherein the micro-texture features have a mean elevation in the range of approximately 10–25 nm.

15. The method of claim 1, wherein the micro-texture features are spaced apart from one another by a mean distance in the range of approximately 5–100 μm.

16. The method of claim 1, wherein the step of irradiating is performed by heating the substrate in an oven.

\* \* \* \* \*